United States Patent
Schoepe et al.

(10) Patent No.: US 10,466,076 B2
(45) Date of Patent: Nov. 5, 2019

(54) SENSOR DEVICE HAVING A TORQUE SENSOR UNIT AND AN INCREMENTAL SENSOR UNIT AND MOTOR VEHICLE HAVING SUCH A SENSOR DEVICE

(71) Applicant: VALEO Schalter und Sensoren GmbH, Bietigheim-Bissingen (DE)

(72) Inventors: Roman Schoepe, Bietigheim-Bissingen (DE); Hans-Jörg Liebfried, Bietigheim-Bissingen (DE); Ekkehart Fröhlich, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 196 days.

(21) Appl. No.: 15/550,225

(22) PCT Filed: Feb. 11, 2016

(86) PCT No.: PCT/EP2016/052874
§ 371 (c)(1),
(2) Date: Aug. 10, 2017

(87) PCT Pub. No.: WO2016/128495
PCT Pub. Date: Aug. 18, 2016

(65) Prior Publication Data
US 2018/0023980 A1    Jan. 25, 2018

(30) Foreign Application Priority Data
Feb. 12, 2015    (DE) .................. 10 2015 102 013

(51) Int. Cl.
*G01D 5/245*    (2006.01)
(52) U.S. Cl.
CPC ................. *G01D 5/2451* (2013.01)

(58) Field of Classification Search
CPC .... G01D 5/2451; G01D 5/145; G01R 33/032; G01S 17/42
(Continued)

(56) References Cited
U.S. PATENT DOCUMENTS

| 5,814,985 A | 9/1998 | Dudet |
| 2008/0314655 A1* | 12/2008 | Scharfenberg ....... B60K 7/0007 180/6.44 |
| 2016/0083008 A1* | 3/2016 | Murakami ........... B62D 5/0421 180/443 |

FOREIGN PATENT DOCUMENTS

| DE | 10 2009 033 242 A1 | 1/2010 |
| DE | 10 2010 033 769 A1 | 2/2012 |

(Continued)

OTHER PUBLICATIONS

Notice of Preliminary Rejection issued in corresponding Korean Application No. 10-2017-7022426 dated May 17, 2018 (24 pages).
(Continued)

*Primary Examiner* — Melissa J Koval
*Assistant Examiner* — Trung Nguyen
(74) *Attorney, Agent, or Firm* — Osha Liang LLP

(57) ABSTRACT

The invention relates to a sensor device (100) having an incremental sensor unit (40, 40', 40") for a shaft rotatable about a rotational axis, in particular for a steering shaft of a motor vehicle, wherein the incremental sensor unit (40, 40', 40") is designed to acquire at least one defined rotational angle position of the shaft. The incremental sensor unit (40, 40', 40") comprises a transmitting element (41, 41") and a housing-fixed receiving element (42), wherein a signal ($M_{Ink\_planar}$) emitted by the transmitting element (41, 41") and transmitted along a signal path is receivable by the
(Continued)

Figure 1:
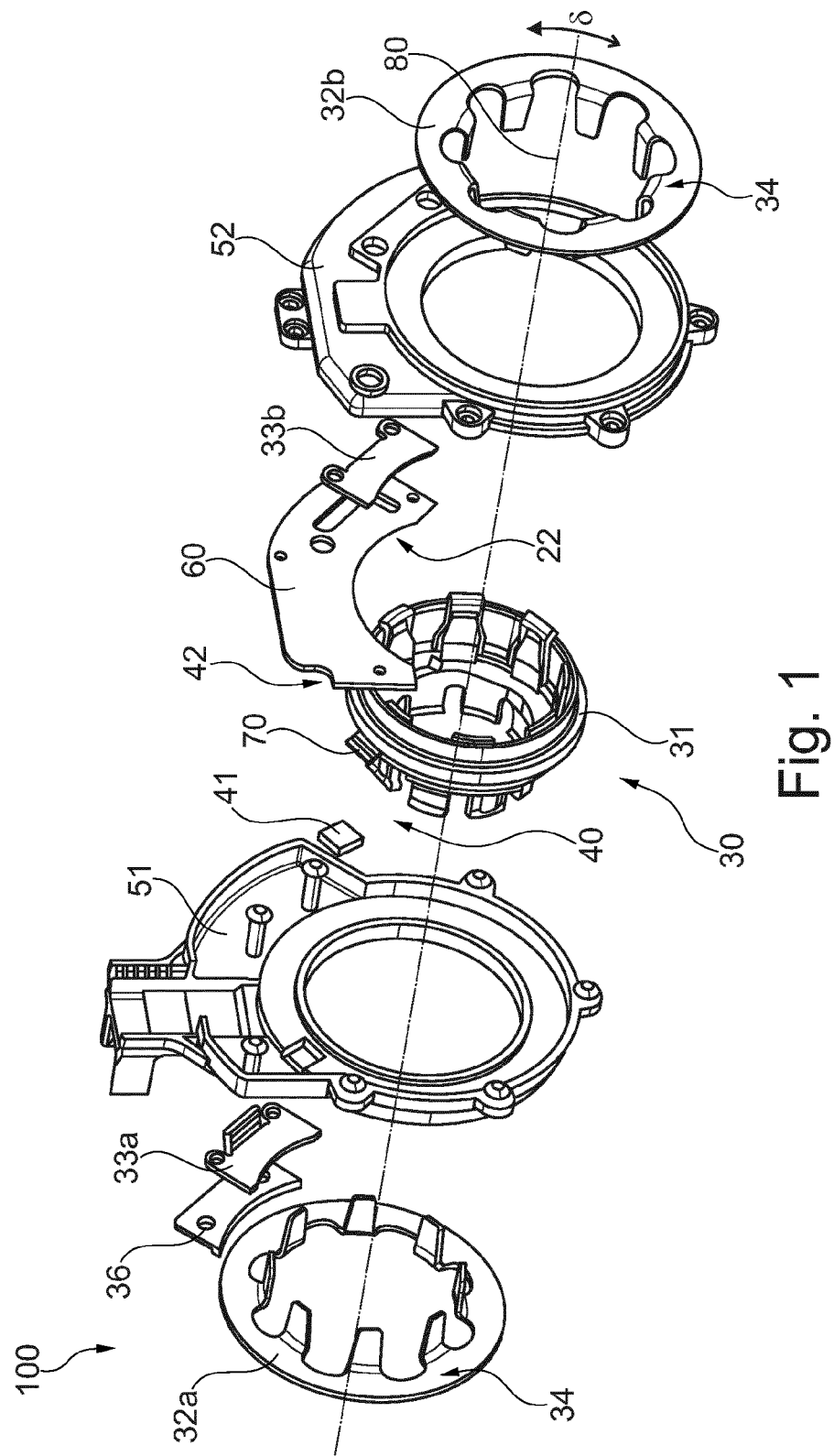

receiving element (42) and it is recognizable on the basis of the signal ($M_{Ink\_planar}$) received by the receiving element (42) whether the shaft is located in the defined rotational angle position ($\delta_{def}$) or not. If the shaft reaches the defined rotational angle position ($\delta_{def}$), a signal pulse can be generated. In this case, the transmitting element (41, 41") is also arranged fixed on the housing, wherein a change of the signal ($M_{Ink\_planar}$) can be caused by a rotational movement of the shaft. Furthermore, the invention relates to a motor vehicle having a sensor device (100).

17 Claims, 5 Drawing Sheets

(58) Field of Classification Search
USPC ........ 324/200, 207.2–207.25, 226, 631, 166, 324/500, 160, 545, 137, 154 R, 76.11, 324/600, 765.01, 177
See application file for complete search history.

(56) References Cited

FOREIGN PATENT DOCUMENTS

| | | |
|---|---|---|
| DE | 10 2012 014 208 A1 | 5/2014 |
| DE | 10 2012 024 383 A1 | 6/2014 |
| DE | 10 2013 006379 A1 | 10/2014 |
| EP | 1 445 173 A2 | 8/2004 |
| EP | 2 743 662 A1 | 6/2014 |
| JP | H07 120273 A | 5/1995 |
| JP | 2008 241370 A | 10/2008 |
| KR | 2011 0041468 A | 4/2011 |

OTHER PUBLICATIONS

International Search Report issued in corresponding application No. PCT/EP2016/052874 dated Apr. 26, 2016 (6 pages).
Written Opinion of the International Searching Authority issued in corresponding application No. PCT/EP2016/052874 dated Apr. 26, 2016 (6 pages).
German Search Report issued in corresponding application No. 10 2015 102 013.0 dated Oct. 9, 2015 (10 pages).

* cited by examiner

SENSOR DEVICE HAVING A TORQUE SENSOR UNIT AND AN INCREMENTAL SENSOR UNIT AND MOTOR VEHICLE HAVING SUCH A SENSOR DEVICE

The invention relates to a sensor device having an incremental sensor unit for a shaft rotatable about a rotational axis, in particular for a steering shaft of a motor vehicle, wherein the incremental sensor unit is designed for acquiring at least one defined rotational angle position of the shaft and comprises a transmitting element and a housing-fixed receiving element, wherein a signal emitted by the transmitting element and transmitted along a signal path is receivable by the receiving element, wherein it is recognizable on the basis of the signal received by the receiving element whether the shaft is located in the defined rotational angle position or not, and wherein the incremental sensor unit is designed to generate a signal pulse upon reaching the defined rotational angle position. Furthermore, the invention relates to a motor vehicle having such a sensor device.

Sensor devices for steering shafts of motor vehicles having incremental sensor units are known in principle from the prior art, for example, from DE 10 2013 006 379 A1.

Using an incremental sensor unit, at least one discrete, defined rotational angle position of a shaft—for example, a zero crossing—can be acquired, so that in particular the number of the revolutions of a shaft can be ascertained using an incremental sensor unit. In motor vehicles, using such incremental sensor units, the number of the revolutions of the steering shaft and therefore the number of the steering wheel revolutions is typically acquired, to plausibility check another absolute, preferably analog or continuous, steering angle signal. This is because it can be coarsely determined on the basis of the digital signal of the incremental sensor unit in which angle range the absolute steering angle range should be, so that it is possible to check the measured absolute angle.

Such incremental sensor units furthermore enable the use of steering angle sensors, the steering angle detection range of which is only 360°, since the number of the revolutions of the steering shaft or the steering wheel, which is connected in a rotationally-fixed manner to the steering shaft, can be acquired using the incremental sensor unit, so that the absolute steering angle can be ascertained from the acquired number of the revolutions and the present angle during a revolution.

The incremental sensor units generate in this case a digital or a discrete signal, in particular a signal pulse, when the shaft reaches the predefined rotational angle position. In this case, the signal or the signal pulse, in the incremental sensor units known from the prior art, for example, in the incremental sensor unit described in above-mentioned DE 10 2013 006 379 A1, is typically generated on the basis of a relative movement of a permanent magnet, which is connected in a rotationally-fixed manner to the shaft, in relation to a fixed or stationary magnetic sensor or a fixed receiving element. The permanent magnet is typically arranged in this case so that it describes a ring-shaped path in the circumferential direction during a rotation of the shaft, which leads past the fixed sensor or the receiving element, so that a signal pulse is generated upon passing the sensor or the receiving element.

Sensor devices having an incremental sensor unit frequently additionally also have a torque sensor unit, for example, the sensor device described in above-mentioned DE 10 2013 006 379 A1, wherein torque sensor units per se are also known in principle from the prior art, for example, from DE 10 2010 033 769 A1, DE 10 2012 014 208 A1, or DE 10 2012 024 383 A1.

Torque sensor units are provided in this case for the purpose of acquiring a torque applied to a shaft, in motor vehicles, in particular to acquire a steering torque applied by the driver to a steering shaft. Such torque sensor units are used, for example, in electrical steering systems, to activate the electric drive motor of the steering system based on the steering torque applied by a driver, for example, to provide a corresponding steering assistance.

In general, torque sensor units having a torsion bar having defined, known torsional rigidity are used for this purpose, wherein the torsion bar in this case connects a first part of an axially divided shaft to a second part of the axially divided shaft.

If a torque is applied to the shaft, this causes twisting of the two parts of the shaft in relation to one another by a measurable twist angle, wherein the twist angle results depending on the applied torque and the rigidity of the torsion bar, so that the applied torque can be ascertained from the detected twist angle in the case of defined, known rigidity of the torsion bar.

Various measurement principles and sensor arrangements are known for measuring the twist angle resulting as a consequence of an applied torque, wherein very frequently magnetic sensor systems are used, in which a circumferential ring magnet, usually designed as a permanent magnet, is connected in a rotationally-fixed manner to the first part of the steering shaft and in which a holder having a magnetically conductive stator is connected in a rotationally-fixed manner to the second part of the shaft, wherein the stator is arranged in the radial direction concentrically around the ring magnet with a small air gap. The magnetic flux of the ring magnet can be conducted via the stator, which typically consists of two separate stator parts each having a region in the form of a ring disk, to a torque magnetic sensor, for example, a Hall sensor, and analysed.

If the ring magnet which is connected in a rotationally-fixed manner to the first part of the shaft is moved by a rotational movement of the shaft in relation to the stator connected to the second part of the shaft, the magnetic flux density changes in the stator, which can be detected by means of the torque magnetic sensor. The change of the magnetic flux density in the stator is dependent in this case, inter alia, on the size of the relative movement of the ring magnet in relation to the stator, i.e., on the twist angle. Therefore, the twist angle can be concluded from the change of the acquired flux density and the torque applied to the shaft can in turn be ascertained from the twist angle, if the torsional rigidity of the torsion bar is known.

If the sensor device, such as the sensor device described in above-mentioned DE 10 2013 006 379 A1, has a torque sensor unit in addition to the incremental sensor unit, in particular if both a defined discrete rotational angle position of the steering shaft and also a torque applied to the steering shaft are magnetically acquired, in particular if the permanent magnet of the incremental sensor unit is guided past the torque magnetic sensor during each steering shaft revolution, undesired coupling of the magnetic field of the incremental sensor unit with the torque magnetic sensor of the torque sensor unit can occur, in particular so-called "crosstalk" as a result of a magnetic scattered field of the permanent magnet of the incremental sensor unit.

The object of the invention is to provide an alternative sensor device having an incremental sensor unit, in particular an alternative sensor device having an incremental sensor unit which enables improved decoupling of the incremental sensor unit from the torque sensor unit.

This object is achieved by a sensor device according to the invention and by a motor vehicle according to the invention having the features according to the respective independent patent claims. Advantageous embodiments of the invention are the subject matter of the dependent patent claims of the description and the figures and will be explained in greater detail hereafter.

The invention relates to a sensor device having an incremental sensor unit for a shaft rotatable about a rotational axis, in particular for a steering shaft of a motor vehicle. The incremental sensor unit is designed in this case for acquiring at least one defined rotational angle position of the shaft and has a transmitting element and a housing-fixed receiving element, wherein a signal emitted by the transmitting element and transmitted along a signal path can be received by the receiving element. It is recognizable on the basis of the signal received by the receiving element whether the shaft is located in the defined rotational angle position or not, wherein the incremental sensor unit is designed to generate a signal pulse upon reaching the defined rotational angle position of the shaft.

According to the invention, the transmitting element of the incremental sensor unit is also fixed on the housing in this case, like the receiving element of the incremental sensor unit, i.e., no relative movement takes place between the transmitting element and the receiving element of the incremental sensor unit. However, a change of the signal received from the receiving element can be caused by a rotational movement of the shaft.

The housing-fixed arrangement according to the invention of the transmitting element of the incremental sensor unit is advantageous in particular for sensor devices which additionally also have a torque sensor unit, in particular a torque sensor unit having a torque magnetic sensor, because due to the also housing-fixed and therefore fixed arrangement of the transmitting element of the incremental sensor unit in the housing, it is possible to avoid the transmitting element of the incremental sensor unit being guided past the torque magnetic sensor of the torque sensor unit during each revolution. Therefore, negative coupling effects between the transmitting element and the torque magnetic sensor can be reduced. In particular, undesired interactions between the torque sensor unit and the incremental sensor unit and occurring interfering influences can be minimized.

In the meaning of the invention, housing-fixed means stationary or fixed in the housing.

To influence the signal transmitted from the transmitting element to the receiving element as a function of the rotational angle position of the shaft according to the invention, so that a change of the signal received from the receiving element can be caused by a rotational movement of the shaft, the incremental sensor unit has, in one advantageous embodiment, a shielding element, which can be coupled in a rotationally-fixed manner to the shaft, extends outward in the radial direction, and preferably acts as a screen.

In one advantageous embodiment, the transmitting element and the receiving element are arranged spaced apart from one another, preferably spaced apart from one another in the axial direction, wherein the transmitting element and the receiving element are arranged in particular in parallel planes. The shielding element is preferably designed and can be coupled to the shaft in this case such that it is movable in the circumferential direction by a rotational movement of the shaft between the planes in which the transmitting element and the receiving element are respectively arranged, wherein the shielding element can be moved through in particular between the transmitting element and the receiving element.

This means, in a particularly advantageous embodiment of a sensor device according to the invention, the shielding element of the incremental sensor unit is designed and can be coupled to the shaft such that it is movable by a rotational movement of the shaft in relation to the fixed transmitting element and in relation to the fixed receiving element, in particular through between the transmitting element and the receiving element.

The shielding element is particularly preferably arranged in this case such that it describes a ring-shaped path in the circumferential direction during a rotation of the shaft, which leads past the fixed receiving element, preferably also past the fixed transmitting element.

In a sensor device, which, in addition to the incremental sensor unit, also has a torque sensor unit, in particular a torque sensor unit having a torque magnetic sensor, the shielding element is also guided in this case past the torque magnetic sensor during each revolution of the shaft. The interfering influence originating from the shielding element on the torque sensor unit is significantly less than an interfering influence originating from a permanent magnet, however, which is guided past the torque magnetic sensor during each revolution of the shaft.

In one particularly advantageous embodiment, the shielding element extends, upon reaching the defined rotational angle position of the shaft, into the signal path between the transmitting element of the incremental sensor unit and the receiving element of the incremental sensor unit and interrupts the signal path, preferably the shortest signal path, between the transmitting element and the receiving element, or attenuates the signal strongly, wherein the shielding element can be coupled to the shaft for this purpose at a position in the circumferential direction associated with the defined rotational angle position. The interruption of the signal path or a strong attenuation of the signal upon reaching the defined rotational angle position can be achieved in particular by means of a shielding element designed as a narrow wing.

Due to the interruption of the signal path and/or due to a strong attenuation of the signal upon passing the receiving element having the shielding element, and therefore due to the interruption or attenuation of a signal flow from the transmitting element to the receiving element, a signal pulse can be generated, which can be analysed or further processed by a control unit.

In the meaning of the invention, in this case a signal pulse is understood as a pulse-type change of the signal received by the receiving element, wherein the pulse-type change can preferably be induced both by an interruption of the signal path and also by the ending of an interruption of the signal path. A pulse-type change of the signal received from the receiving element can also be induced, however, by a sudden strong attenuation or a sudden increase of the signal.

In an alternative, but also advantageous embodiment, the shielding element extends outside the defined rotational angle position of the shaft into the signal path between the transmitting element of the incremental sensor unit and the receiving element of the incremental sensor unit and, outside the defined rotational angle position of the shaft, interrupts the signal path, preferably the shortest signal path, between the transmitting element and the receiving element, or strongly attenuates the signal outside the defined rotational angle position, wherein the shielding element can be coupled to the shaft for this purpose at a position in the circumferential direction associated with the defined rotational angle position. The interruption of the signal path outside the defined rotational angle position or a strong attenuation of the signal outside the defined rotational angle position can be achieved in particular by means of a shielding element designed as an open ring disk.

In one advantageous embodiment, the shielding element is therefore a disk-shaped segment, in particular a ring-disk-shaped segment, wherein the shielding element is preferably a wing which can be coupled to the shaft at a predetermined rotational angle position or a ring disk, which is open in the circumferential direction, having a position of the opening of the ring disk in the circumferential direction associated with the defined rotational angle position.

In one particularly advantageous embodiment, the transmitting element is a magnet, preferably a permanent magnet, and the receiving element is a magnetic sensor, in particular a Hall sensor, wherein the shielding element is preferably made ferromagnetic in this case, to be able to influence the signal received from the receiving element according to the invention.

In one advantageous embodiment, the magnetic sensor of the incremental sensor unit is designed as insensitive in the axial direction and sensitive in the tangential and/or radial direction. An interfering coupling of the magnetic sensor of the incremental sensor unit with a magnetic field resulting in the axial direction between ring-disk-shaped regions of magnetically conductive stator parts of a torque sensor unit can thus be reduced or avoided nearly completely.

In one advantageous embodiment, the magnet forming the transmitting element of the incremental sensor unit is designed as bipolar, wherein the magnet is preferably disk-shaped and in particular has an adjacent north pole and south pole. However, the magnet can also be made round-shaped, for example, cylindrical or spherical.

In one particularly advantageous embodiment, a partition plane which separates the poles of the magnet of the incremental sensor unit is oriented in the radial direction, so that the field lines of the magnet of the incremental sensor unit are aligned in a planar plane oriented perpendicularly in relation to the rotational axis of the shaft.

In one alternative embodiment, the partition plane for pole separation of the poles of the magnet of the incremental sensor unit is oriented at an angle in relation to the radial direction, but parallel to the rotational axis of the shaft. Thus, with corresponding embodiment of the shielding element, an edge of the shielding element facing toward the transmitting element of the incremental sensor unit can be oriented at an angle in relation to the field direction of the magnetic field generated by the transmitting element, so that upon the approach of the shielding element to the magnetic field, in particular upon the approach of the edge of the shielding element to the magnetic field, the field lines rotate. As the shielding element moves through between the transmitting element and the receiving element, not only the field strength between transmitting element and receiving element is then influenced and/or modulated, but rather also the field direction. To be able to utilize this advantage, the receiving element should be a magnetic sensor, which can also detect the field direction of the magnetic field in the planar plane oriented perpendicularly in relation to the rotational axis of the shaft, in which the field lines are aligned.

In one alternative embodiment, the transmitting element is a light source and the receiving element is a light sensor, wherein the shielding element is designed as opaque in this case and shading of the light sensor can be caused by means of the shielding element.

However, in an alternative embodiment, the transmitting element and the receiving element can also each be formed by at least one inductive coil, wherein the shielding element should be made metallic in this case, to be able to influence an inductive coupling of the transmitting element with the receiving element.

In one particularly advantageous embodiment, the sensor device additionally has a torque sensor unit, wherein the torque sensor unit is designed to acquire a torque applied to the shaft, preferably to acquire a torque applied to a shaft, which has a first part and a second part which can be twisted in relation to the first part, wherein in particular the first and the second parts of the shaft are connected to one another by means of a torsion bar.

For this purpose, the sensor unit preferably has a ring magnet connectable in a rotationally-fixed manner to the first part of the shaft, a housing-fixed torque magnetic sensor, and a stator connectable in a rotationally-fixed manner to the second part of the shaft for conducting a magnetic flux from the ring magnet to the torque magnetic sensor.

In one advantageous embodiment, the shielding element of the incremental sensor unit is connected in a rotationally-fixed manner to the stator of the torque sensor unit in this case, wherein the shielding element is preferably fastened on the stator, in particular on a stator holder.

A motor vehicle according to the invention having a steering shaft and a sensor device for acquiring at least one defined rotational angle position of the shaft is characterized in that it comprises an above-described sensor device according to the invention.

The advantageous embodiments presented with reference to the sensor device and the advantages thereof apply in this case not only to the sensor device, but rather also accordingly to a motor vehicle according to the invention.

Further features of the invention result from the claims, the figures, and the description of the figures. All features and feature combinations mentioned above in the description and the features and feature combinations mentioned hereafter in the description of the figures and/or shown solely in the figures are usable not only in the respectively specified combination but rather also in other combinations or alone.

Some of the mentioned features or properties relate to both a sensor device according to the invention and also a motor vehicle according to the invention. Several of these features and properties are sometimes only described once, but apply independently of one another in the scope of technically possible embodiments to both a sensor device according to the invention and also a motor vehicle according to the invention.

The invention will be explained in greater detail on the basis of several preferred exemplary embodiments with reference to the appended drawings.

Figure 2:
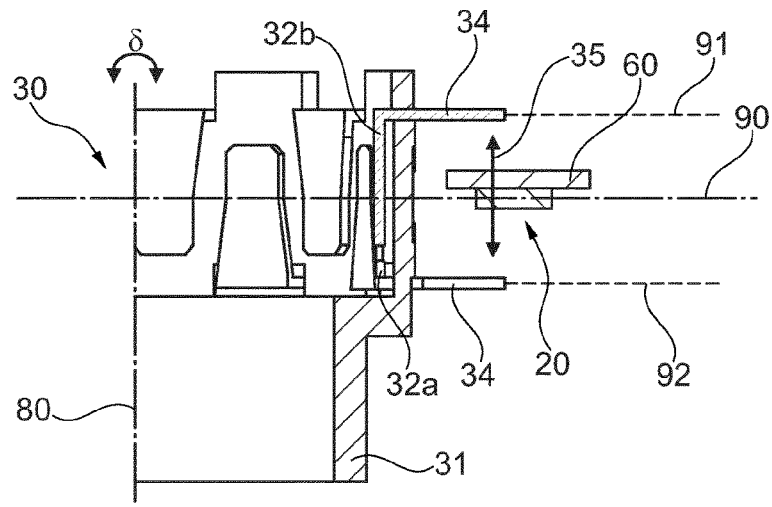
Figure 3A:
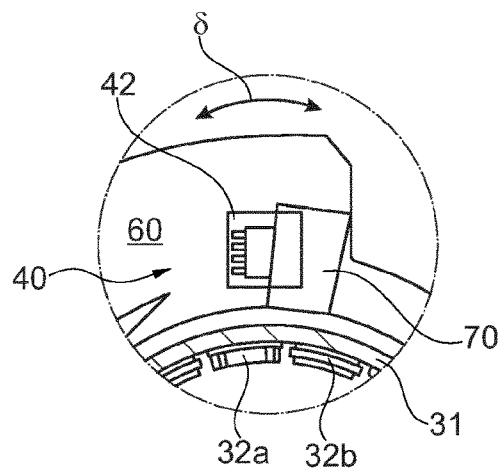
Figure 3B:
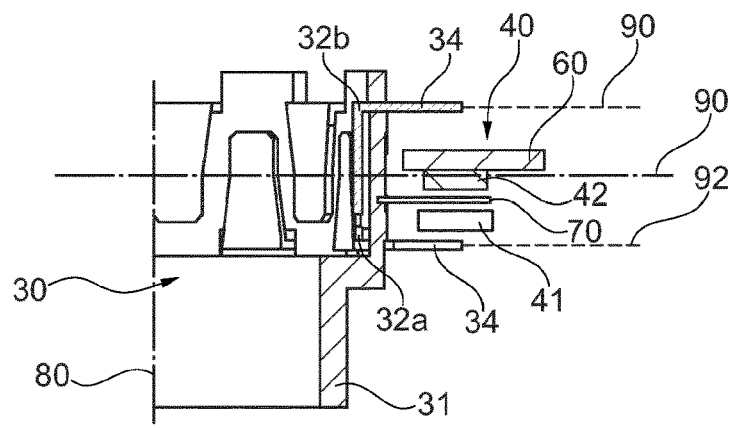
Figure 4:
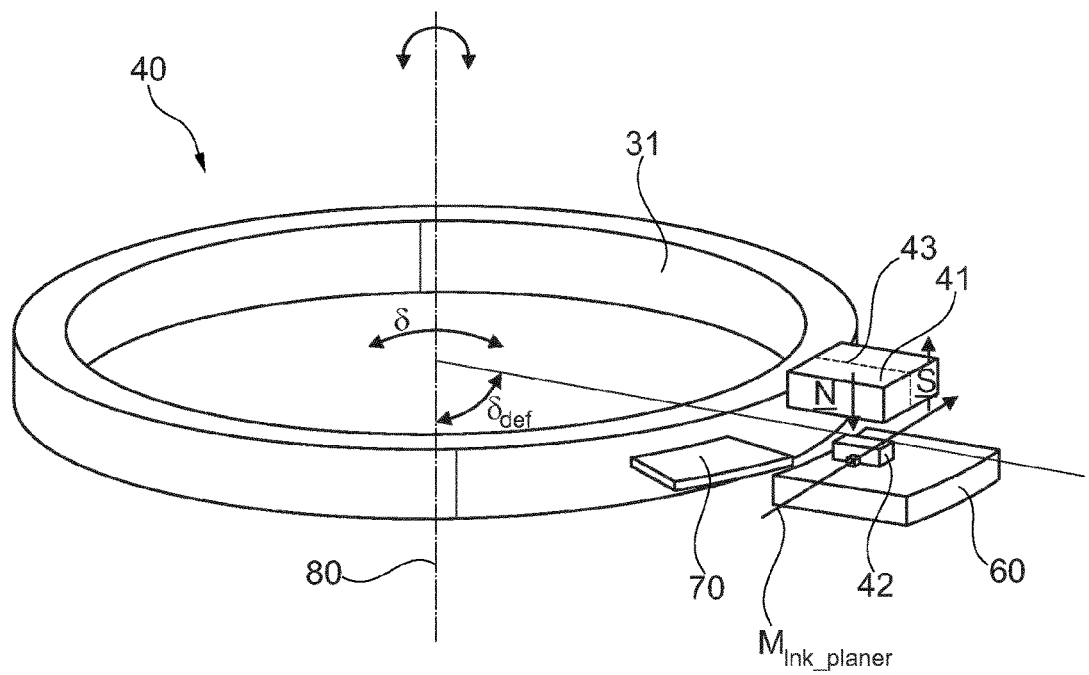
Figure 5:
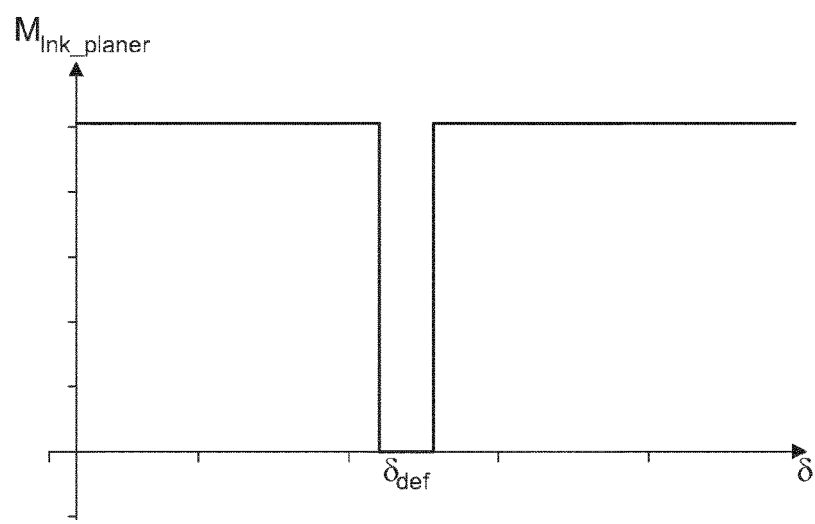
Figure 6:
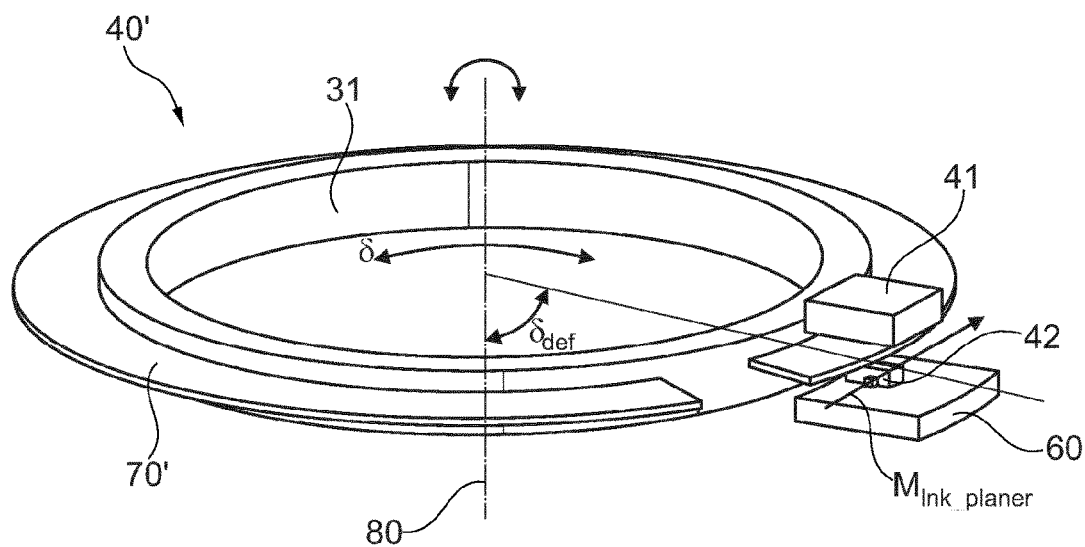
Figure 7:
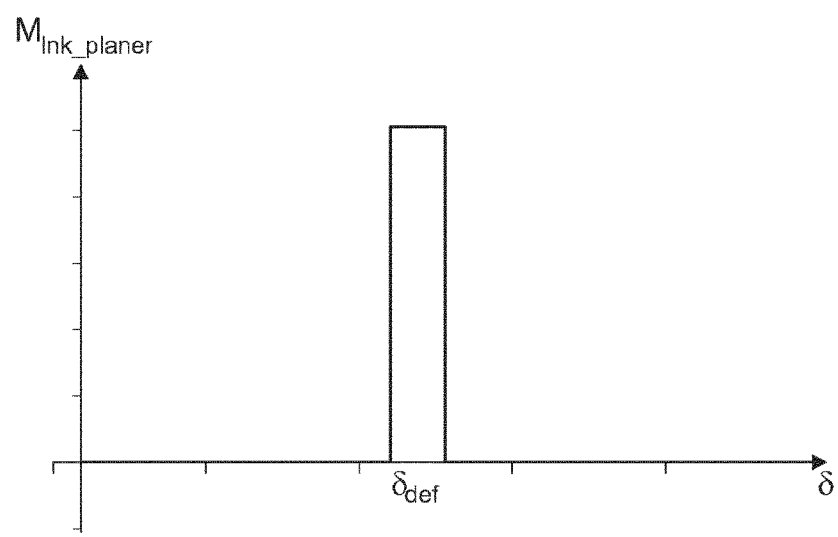
Figure 8:
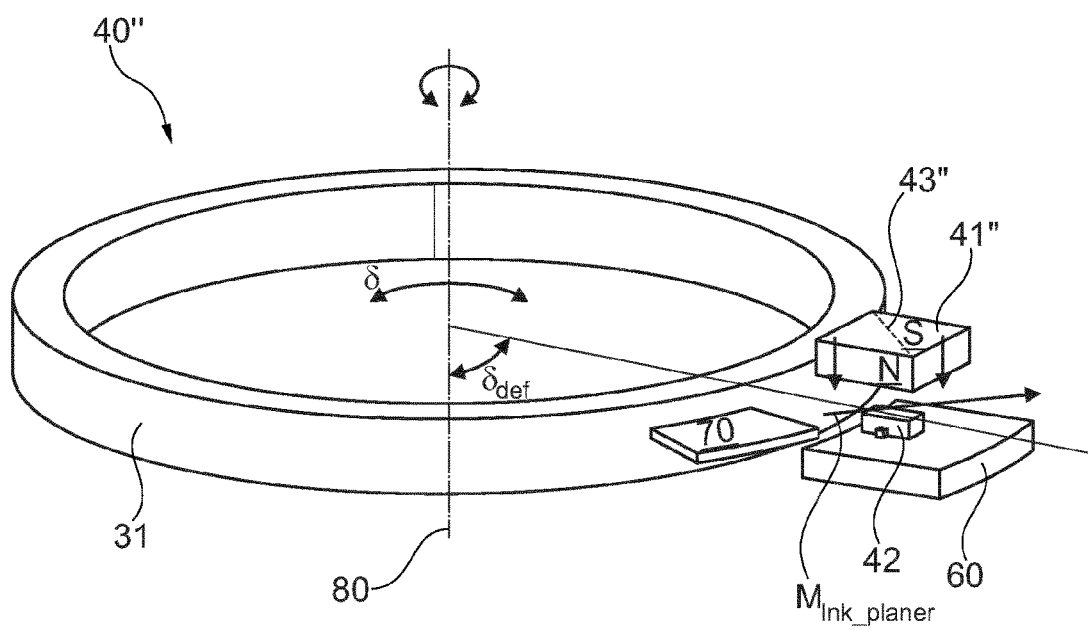

In the figures:

FIG. 1 shows an exploded illustration of partial components of a sensor device according to the invention according to a first embodiment of the invention, FIG. 2 shows a quarter section through the sensor device according to the invention from FIG. 1 in the region of the torque magnetic sensor in a plane of section parallel to the rotational axis of the shaft, FIG. 3*a* shows an enlarged illustration of a detail of the sensor device according to the invention from FIGS. 1 and 2 in section along a plane of section extending perpendicularly in relation to the rotational axis of the shaft with a top view of the incremental sensor unit from FIG. 3b, FIG. 3b shows a quarter section through the sensor device according to the invention from the preceding figures in a plane of section parallel to the rotational axis of the shaft, but in the region of the transmitting element and the receiving element of the incremental sensor unit, FIG. 4 shows the incremental sensor unit of the sensor device according to the invention from the preceding figures in a schematic, perspective illustration having a shielding element fastened on the stator holder and the housing-fixed arrangement according to the invention of transmitting element and receiving element, FIG. 5 shows the signal curve of a signal received from the receiving element of the incremental sensor unit from FIG. 4 as a function of the rotational angle position of the shaft in the case of a shielding element embodied according to FIG. 4, FIG. 6 shows an alternative exemplary embodiment of an incremental sensor unit of a sensor device according to the invention, also in a schematic, perspective illustration having a shielding element fastened on the stator holder and the housing-fixed arrangement according to the invention of transmitting element and receiving element, FIG. 7 shows the signal curve of a signal received from the receiving element of the incremental sensor unit from FIG. 6 as a function of the rotational angle position of the shaft with a shielding element embodied according to FIG. 6, FIG. 8 shows a further, alternative exemplary embodiment of an incremental sensor unit of a sensor device according to the invention, also in a schematic, perspective illustration having a shielding element fastened on the stator holder and the housing-fixed arrangement according to the invention of transmitting element and receiving element.

FIG. 1 shows an exploded view of the partial components of a sensor device 100 according to the invention having a torque sensor unit (not shown in greater detail in FIG. 1) and an incremental sensor unit 40, wherein the sensor unit 100 is conceived especially for a steering shaft of a motor vehicle.

The sensor device 100 according to the invention is designed in this case for arrangement on a steering shaft (not shown here) rotatable about a rotational axis 80, which shaft has a first part and a second part, wherein the first part and the second part of the steering shaft are connected to one another in the axial direction via a torsion bar (also not shown).

The torque sensor unit of the sensor device 100 according to the invention has in this case, for acquiring a torque applied to the steering shaft, a permanent ring magnet (also not shown), which is connectable in a rotationally-fixed manner to the first part of the steering shaft, a housing-fixed torque magnetic sensor 22, and a stator 30, which is connectable in a rotationally-fixed manner to the second part of the steering shaft, for conducting a magnetic flux from the ring magnet to the torque magnetic sensor 22.

The torque magnetic sensor 22, which is formed by a Hall sensor 22, is arranged in this case on a side of a ring-disk-segment-shaped printed circuit board 60, which is fastened in a stationary manner on a housing, wherein the housing in this sensor device 100 according to the invention is formed by the two housing parts 51 and 52. The printed circuit board 60, on which the torque magnetic sensor 22 is arranged, is arranged in this case in the radial direction outside the steering shaft, wherein the printed circuit board plane is oriented perpendicularly in relation to the rotational axis 80.

The stator 30, which is formed in this exemplary embodiment by a stator holder 31 formed from plastic and two magnetically conductive stator parts 32a and 32b, and which is provided for conducting the magnetic flux generated by the ring magnet to the torque magnetic sensor 22 on the printed circuit board 60, can be connected in a rotationally-fixed manner to the second part of the steering shaft and is mounted in a sliding manner in the housing of the sensor device 100, so that the stator 30 can follow a rotational movement of the steering shaft and can move in relation to the housing and the torque magnetic sensor 22, which is fastened in a stationary manner on the housing via the printed circuit board 60.

The two stator parts 32a and 32b are in particular made soft-magnetic and each have a ring-disk-shaped region 34 oriented perpendicularly in relation to the rotational axis 80 of the steering shaft and extending outward in the radial direction. The two stator parts 32a and 32b are accommodated in this case by the stator holder 31 such that the ring-disk-shaped regions 34 are each arranged spaced apart from one another in the axial direction in parallel planes 91, 92 and having an air gap concentrically in relation to the ring magnet, see FIG. 2.

Since the stator parts 32a and 32b are made magnetically conductive, as a result of the magnetic field of the ring magnet, a magnetic flux results in the stator parts 32a and 32b. Thus, an axially aligned magnetic field 35, inter alia, forms between the two ring-disk-shaped regions 34 of the stator parts 32a and 32b, which is symbolically indicated in FIG. 2 by the arrow identified with the reference sign 35.

If the torque sensor 22 fastened on the printed circuit board 60, as in the exemplary embodiment shown in FIG. 2 of a sensor device 100 according to the invention, is arranged in the axial direction between the ring-disk-shaped regions 34 of the stator parts 32a and 32b, the magnetic flux generated by the ring magnet in the stator parts 32a and 32b can be acquired.

To amplify the flux density in the region of the torque magnetic sensor 22 and therefore to improve the resolution of the torque sensor unit 20, in the described sensor device 100, two disk-segment-shaped flux conductors 33a and 33b are additionally also provided in the region of the torque magnetic sensor 22, which are fastened in a stationary manner on the housing via corresponding holders 36, also spaced apart in the axial direction in relation to one another, each in parallel planes extending perpendicularly in relation to the rotational axis 80, see FIG. 1.

In the sensor device 100, the printed circuit board 60 having the torque magnetic sensor 22 fastened thereon is arranged between the ring-disk-shaped regions 34 of the stator parts 32a and 32b such that the torque magnetic sensor 22 is located in the axial direction precisely in the centre, i.e., in a radial centre plane 90, between the ring-disk-shaped regions 34 of the stator parts 32a and 32b.

If the steering shaft is torsioned by a torque applied to the steering shaft and the first part of the steering shaft is twisted in relation to the second part of the steering shaft, a relative movement of the ring magnet in relation to the stator 30 is thus generated, whereby the magnetic flux density changes in the two stator parts 32a and 32b, in particular in the ring-disk-shaped regions 34, which can be acquired by the torque magnetic sensor 22. The relative position of the ring magnet in relation to the stator 30, i.e., the twist angle, can be concluded from the acquired flux density or the acquired flux density change. If the rigidity of the torsion bar is known, the torque applied to the steering shaft may be ascertained therefrom.

Using the incremental sensor unit 40 of the sensor device 100 according to the invention, a discrete, defined rotational angle position $\delta_{def}$ of the steering shaft can be acquired, wherein in this case the defined rotational angle position $\delta_{def}$ defines a zero crossing, i.e., in each case a rotational angle of $\delta=0°$ in relation to a revolution, so that the number of the revolutions of the steering shaft can be ascertained using the incremental sensor unit. If the number of the revolutions of the steering shaft is known, another absolute, preferably analog or continuous steering angle signal can be plausibility checked. In particular, it can be coarsely determined on the basis of the digital signal of the incremental sensor unit in which angle range the absolute steering angle range is to be, so that a check of the measured absolute angle is possible, for example, whether an absolute steering angle of 40° or 400° is present.

For this purpose, the incremental sensor unit 40 has a housing-fixed magnetic Hall sensor 42 arranged on the printed circuit board 60, which is referred to hereafter as receiving element 42, and an associated transmitting element 41 in the form of a disk-shaped, bipolar permanent magnet 41.

The transmitting element 41 is arranged according to the invention fixed on the housing on the housing of the sensor device 100 formed by the housing parts 51 and 52, wherein a change of the signal received by the receiving element 42 can be caused by a rotational movement of the steering shaft, so that it can be recognized whether the steering shaft is located in the predetermined rotational angle position $\delta_{def}$ or not.

The receiving element 42 is arranged in this exemplary embodiment of a sensor unit 100 according to the invention in this case on the same side of the printed circuit board 60 as the torque magnetic sensor 22, but offset in relation thereto in the circumferential direction, cf. FIG. 2 and FIG. 3b, wherein FIG. 2 shows a quarter section through the sensor device 100 according to the invention from FIG. 1 in the region of the torque magnetic sensor 22 in a plane of section parallel to the rotational axis 80 of the shaft, while FIG. 3b shows the corresponding section in the region of the transmitting element and the receiving element of the incremental sensor unit. Of course, the receiving element 42 and the torque magnetic sensor 22 can also be arranged on different sides of the printed circuit board 60, however.

To minimize interfering influences due to the axially aligned magnetic field 35, which results between the ring-disk-shaped regions 34 of the stator parts 32a and 32b, on the receiving element 42, which is also formed by a Hall sensor 42, the receiving element 42 or the Hall sensor 42 is advantageously designed as insensitive in the axial direction in this exemplary embodiment and is only designed as sensitive in the planar plane 90 oriented perpendicularly to the rotational axis 80. This means a change of the magnetic field generated by the transmitting element 41 can only be detected by the receiving element 42 in a plane 90 of the stator parts 32a and 32b parallel to the ring-disk-shaped regions 34 or in the planar centre plane 90 parallel to the printed circuit board 60.

To be able to detect a corresponding signal using the receiving element 42, the transmitting element 41 or the permanent magnet 41 forming the transmitting element is accordingly designed for the purpose of generating a magnetic field acting in the planar plane 90 of the receiving element 42. This means the permanent magnet 41 has to be designed such that a correspondingly oriented magnetic field results.

A transmitting element 41 in the form of a bipolar, disk-shaped permanent magnet 41 has proven to be particularly advantageous in this case, as schematically shown on the basis of FIG. 4, having a north pole N arranged adjacent to a south pole S, wherein the poles N, S are oriented such that the field lines of the magnetic field extending from the north pole N to the south pole S are at least partially aligned such that they extend tangentially and/or radially in relation to the steering shaft in the planar plane 90 and can be received as a signal $M_{Ink\_planar}$ by the receiving element 42. For this purpose, as is recognizable in the example shown in FIG. 4, a partition plane 43 of the permanent magnet 41, which separates the north pole N from the south pole S, is preferably oriented in the radial direction.

The transmitting element 41 and the receiving element 42 are arranged spaced apart in relation to one another in parallel planes in the axial direction in the incremental sensor unit 40 of the sensor device 100 according to the invention shown in FIG. 4, wherein the transmitting element 41 is arranged on the same side of the printed circuit board 60 as the receiving element 42 in relation to the receiving element 42. A signal emitted from the transmitting element 41 and transmitted along a signal path can therefore be received by the receiving element 42. It is recognizable on the basis of the signal received by the receiving element 42 whether the steering shaft is located in the defined rotational angle position $\delta_{def}$ or not. In this case, the incremental sensor unit 40 is designed to generate a signal pulse upon the steering shaft reaching the defined rotational angle position $\delta_{def}$.

To cause a change of the signal received by the receiving element 42 by way of a rotational movement of the steering shaft, the incremental sensor unit 40 has a ferromagnetic shielding element 70, which is fastened in a rotationally-fixed manner on the stator holder 31, and which is formed in the exemplary embodiment of a sensor device 100 according to the invention shown in FIG. 1 by a disk-shaped, ferromagnetic plate 70 in the form of a wing, which extends outward in the radial direction. The shielding element 70 is designed in this case and arranged on the stator holder 31 such that it can be moved in the circumferential direction during a rotation of the steering shaft between the planes in which the transmitting element 41 and the receiving element 42 are respectively located, in particular through between the transmitting element 41 and the receiving element 42.

If the ferromagnetic shielding element 70 is moved between the transmitting element 41 and the receiving element 42 as a result of a rotational movement of the steering shaft, the magnetic field lines are "collected" by the shielding element 70 as a result of the ferromagnetic properties thereof and the receiving element 42 is thus shaded, so that the magnetic field strength of the planar field component acquired by the receiving element 42 and therefore the signal $M_{Ink\_planar}$ received by the receiving element 42 drops off strongly.

FIG. 5 shows the associated signal curve of the signal $M_{Ink\_planar}$ received by the receiving element 42 over the rotational angle position $\delta$, wherein upon reaching the predetermined, defined rotational angle position $\delta_{def}$, a corresponding signal pulse is generated as a result of the shading of the receiving element 42 by the shielding element 70. If the shielding element 70 is formed by a narrow wing in this case, as in this incremental sensor unit 40, cf. FIGS. 3a and 3b, the signal pulse is generated by an interruption of the signal $M_{Ink\_planar}$. To generate the signal pulse upon reaching the defined rotational angle position $\delta_{def}$, the shielding element 70 is fastened in a corresponding position, which is associated with the defined rotational angle position $\delta_{def}$ in the circumferential direction on the stator holder 31.

The signal $M_{Ink\_planar}$ received by the receiving element, which reflects the planar magnetic field strength in this case, can be provided directly as an output signal and can be transmitted to a control unit in which an analysis can then be performed, to determine the number of the revolutions of the steering shaft. Of course, it is also possible to provide the generated signal pulse as a trigger for a switching function, which switches an output upon exceeding or falling below a specific field strength.

FIG. 6 shows an alternative exemplary embodiment of an incremental sensor unit 40' for a sensor device according to the invention, wherein in this exemplary embodiment the shielding element 70' is formed by a ring disk 70' open in the circumferential direction, wherein the position of the opening of the ring disk 70' in the circumferential direction is associated with the defined rotational angle position $\delta_{def}$. In this case, the signal pulse is generated by cancelling the interruption of the signal path upon reaching the predefined rotational angle position $\delta_{def}$ because of the opening in the ring disk 70', i.e., when the opening in the ring disk 70' is located between the transmitting element 41 and the receiving element 42.

The associated curve of the signal $M_{Ink\_planar}$ received by the receiving element 42 resulting in this case is shown in FIG. 7.

The pulse duration of the signal pulse can be influenced via the width of the shielding element 70 or 70' in the circumferential direction, i.e., via the width of the wing or the opening. Of course, it is also possible to provide multiple shielding elements or a shielding element, which is designed as an open ring disk, having multiple openings, so that a signal pulse can be generated at multiple, defined rotational angle positions.

FIG. 8 shows a further possible embodiment of an incremental sensor unit 40", wherein in this embodiment, in contrast to the above-described exemplary embodiments, the partition plane 43' between the north pole N and the south pole S of the transmitting element 41" is not oriented in the radial direction, but rather at an angle thereto, but still parallel to the rotational axis 80, so that the field lines of the magnetic field generated by the transmitting element 41" are not aligned in the tangential direction in the planar plane 90, but rather in a radial-tangential direction.

This has the result that upon the approach of an edge of the shielding element 70 or 70', the field lines rotate. As the shielding element 70 or 70' moves through between the transmitting element 41" and the receiving element 42, not only the field strength but rather also the field direction is then modulated. Thus, not only can a predetermined, defined rotational angle position $\delta_{def}$ be recognized, but rather additionally a rotational direction with which the predetermined rotational angle position $\delta_{def}$ has been reached, i.e., it can additionally be recognized whether the steering shaft has last rotated around to the left or right.

To be able to utilize this effect, it is advantageous if the receiving element 42, i.e., the Hall sensor 42, is formed by a magnetic sensor, which is designed for the purpose of also detecting the field direction in the planar plane 90 in addition to acquiring the field strength of a magnetic field.

A similar effect as with a partition plane 43 not oriented in a radial direction, but rather in a partition plane 43' oriented at an angle in relation to the radial direction, can also be achieved, however, by having each of the edges of the shielding element 70, 70' correspondingly extending at an angle in relation to the radial direction. This means the edges of the wing or the edges of the opening of the ring disk are not oriented in the radial direction, but rather inclined thereto.

It is also conceivable, instead of providing a solid magnet as the transmitting element 41 or 41", to provide a transmitting element having only a bipolar surface magnetization, wherein the two poles, i.e., the north pole N and the south pole S, are preferably formed in this case on the surface facing toward the receiving element 42, however.

Of course, it is also conceivable to only provide a magnetization in a plane parallel to the plane 90 within the transmitting element.

In the above-described exemplary embodiments, the transmitting element 41 or 41" and the receiving element 42 are each arranged spaced apart from one another in the axial direction in parallel planes in this case, i.e., essentially opposing. However, it is also possible to arrange the transmitting element fixed on the housing radially outside the receiving element, if the receiving element is a magnetic sensor and the transmitting element is designed as a magnet. This is because the strength and/or the direction of the magnetic field generated by the transmitting element also changes as the shielding element 70 or 70' moves past the receiving element 42 with such an arrangement. Such arrangements having a magnetic transmitting element and a magnetic sensor as the receiving element having a ferromagnetic target which is not arranged between the transmitting element and the receiving element, wherein the shielding element 70 or 70' would form the target in a correspondingly designed sensor device according to the invention, are fundamentally known from the prior art and are used, for example, in the case of detection of a position of crankshafts or camshafts or in ABS systems. Reference is made in this regard to U.S. Pat. No. 5,814,985 by way of example.

Of course, it is also possible to use a light source as a transmitting element 41, 41" instead of a magnet as a transmitting element 41, 41" and accordingly to provide a light sensor, which forms an optical light barrier and is available in a variety of structural shapes, as a receiving element 42 instead of a magnetic sensor 42. The shielding element 70, 70' is to be embodied as opaque in this case such that shading or interruption of the shading of the light sensor 42 can be caused.

The use of an optical light barrier has the advantage in particular that the shielding element 70, 70" can be produced from plastic and can be injection-moulded directly onto the stator holder 31, for example.

However, a disadvantage in the case of optical systems is the risk of soiling of transmitting element 41, 41" and/or receiving element 42, for example, by lubrication grease or the like in the installation space, and also the condensation of moisture, wherein the influence of the soiling can be reduced or computed out in many cases by corresponding compensation algorithms in the control unit, however.

Of course, other measurement principles, for example, inductive or capacitive measurement principles, can also be used to receive a signal emitted by the transmitting element 41, 41" of the incremental sensor unit by means of a receiving element 42.

For example, the transmitting element 41, 41" and the receiving element 42 can also each be formed by an inductive coil in conjunction with a metallic shielding element 70, 70", to be able to influence an inductive coupling of the transmitting element 41, 41" with the receiving element 42 and generate a signal pulse.

The invention claimed is:

1. A sensor device comprising:
an incremental sensor unit for a steering shaft of a motor vehicle rotatable about a rotational axis,
wherein the incremental sensor unit is for acquiring at least one defined rotational angle position of the shaft and comprises a transmitting element and a housing-fixed receiving element,
wherein a signal emitted by the transmitting element and transmitted along a signal path is receivable by the receiving element,
wherein it is recognizable on the basis of the signal received by the receiving element whether the shaft is located in the defined rotational angle position or not,
wherein the incremental sensor unit is configured to generate a signal pulse upon reaching the defined rotational angle position of the shaft,
wherein the transmitting element is arranged fixed on the housing,
wherein a change of the signal received by the receiving element is caused by a rotational movement of the shaft, and
wherein the incremental sensor unit comprises a shielding element coupled to the shaft such that the shielding element is movable in the circumferential direction, through between the transmitting element and the receiving element, by a rotational movement of the shaft between parallel planes in which the transmitting element and the receiving element are arranged.

2. The sensor device according to claim 1, wherein the shielding element is coupled in a rotationally-fixed manner to the shaft and extends outward in the radial direction, wherein the shielding element influences the signal transmitted from the transmitting element to the receiving element as a function of a rotational angle position of the shaft so that a change of the signal received by the receiving element is caused by a rotational movement of the shaft.

3. The sensor device according to claim 1, wherein the transmitting element and the receiving element are arranged spaced apart from one another in the axial direction in the parallel planes.

4. The sensor device according to claim 1, wherein the shielding element, upon reaching the defined rotational angle position of the shaft, extends into the signal path between the transmitting element of the incremental sensor unit and the receiving element of the incremental sensor unit and interrupts the signal path between the transmitting element and the receiving element, wherein the shielding element is coupled to the shaft at a position in the circumferential direction associated with the defined rotational angle position.

5. The sensor device according to claim 1, wherein the shielding element, outside the defined rotational angle position of the shaft, extends into the signal path between the transmitting element of the incremental sensor unit and the receiving element of the incremental sensor unit and interrupts the signal path between the transmitting element and the receiving element, wherein the shielding element is coupled to the shaft at a position in the circumferential direction associated with the defined rotational angle position.

6. The sensor device according to claim 1, wherein the shielding element is a ring-disk-shaped segment, wherein the shielding element is a wing which is coupled to the shaft at a position associated with the defined rotational angle position or a ring disk open in the circumferential direction having a position of the opening of the ring disk in the circumferential direction associated with the defined rotational angle position.

7. The sensor device according to claim 1, wherein the transmitting element is a permanent magnet, and the receiving element is a Hall sensor, wherein the shielding element is made ferromagnetic.

8. The sensor device according to claim 7, wherein the magnetic sensor of the incremental sensor unit is configured as insensitive in the axial direction and sensitive in the tangential and/or radial direction.

9. The sensor device according to claim 7, wherein the magnet forming the transmitting element of the incremental sensor unit is bipolar, wherein the magnet is formed in a disk shape.

10. The sensor device according to claim 7, wherein a partition plane which separates poles (N, S) of the magnet of the incremental sensor unit is oriented in the radial direction.

11. The sensor device according to claim 7, wherein the partition plane for pole separation of the poles (N, S) of the magnet of the incremental sensor unit is oriented at an angle in relation to the radial direction.

12. The sensor device according to claim 1, wherein the transmitting element is a light source and the receiving element is a light sensor, wherein the shielding element is made opaque and shading of the light sensor is caused by the shielding element.

13. The sensor device according to claim 1, wherein the transmitting element and the receiving element are each formed by at least one inductive coil, wherein the shielding element is made metallic and inductive coupling of the transmitting element with the receiving element is influenced by the shielding element.

14. The sensor device according to claim 1, wherein the sensor device further comprises a torque sensor unit, wherein the torque sensor unit is configured to acquire a torque applied to a shaft having a first part and a second part which can be twisted in relation to the first part, wherein the first and the second parts of the shaft are connected to one another by a torsion bar.

15. The sensor device according to claim 14, wherein the torque sensor unit comprises a ring magnet connectable in a rotationally-fixed manner to the first part of the shaft, a housing-fixed torque magnetic sensor, and a stator connectable in a rotationally-fixed manner to the second part of the shaft for conducting a magnetic flux from the ring magnet to the torque magnetic sensor.

16. The sensor device according to claim 15, wherein the shielding element of the incremental sensor unit is connected in a rotationally-fixed manner to the stator of the torque sensor unit, wherein the shielding element is fastened on a stator holder.

17. A motor vehicle comprising:
a steering shaft; and
a sensor device for acquiring at least one defined rotational angle position of the steering shaft, comprising:
an incremental sensor unit for the steering shaft of the motor vehicle rotatable about a rotational axis,
wherein the incremental sensor unit is for acquiring at least one defined rotational angle position of the shaft and comprises a transmitting element and a housing-fixed receiving element,
wherein a signal emitted by the transmitting element and transmitted along a signal path is receivable by the receiving element, wherein it is recognizable on the basis of the signal received by the receiving element whether the shaft is located in the defined rotational angle position or not, wherein the incremental sensor unit is configured to generate a signal pulse upon reaching the defined rotational angle position of the shaft, wherein the transmitting element is arranged fixed on the housing, wherein a change of the signal received by the receiving element is caused by a rotational movement of the shaft, and wherein the incremental sensor unit comprises a shielding element coupled to the shaft such that the shielding element is movable in the circumferential direction, through between the transmitting element and the receiving element, by a rotational movement of the shaft between parallel planes in which the transmitting element and the receiving element are arranged.

* * * * *